(12) United States Patent
Belli

(10) Patent No.: US 12,145,400 B2
(45) Date of Patent: Nov. 19, 2024

(54) WHEEL WITH MOVABLE ELEMENTS

(71) Applicant: Andrea Belli, Rome (IT)

(72) Inventor: Andrea Belli, Rome (IT)

( * ) Notice: Subject to any disclaimer, the term of this patent is extended or adjusted under 35 U.S.C. 154(b) by 974 days.

(21) Appl. No.: 16/961,833

(22) PCT Filed: Jan. 25, 2019

(86) PCT No.: PCT/IB2019/050619
§ 371 (c)(1),
(2) Date: Jul. 13, 2020

(87) PCT Pub. No.: WO2019/145901
PCT Pub. Date: Aug. 1, 2019

(65) Prior Publication Data
US 2020/0384802 A1  Dec. 10, 2020

(30) Foreign Application Priority Data

Jan. 26, 2018 (IT) .................. 102018000002050

(51) Int. Cl.
*B60B 19/04* (2006.01)
*A61G 5/06* (2006.01)
(Continued)

(52) U.S. Cl.
CPC .............. *B60B 19/04* (2013.01); *A61G 5/061* (2013.01); *B60B 9/10* (2013.01); *B62B 5/026* (2013.01);
(Continued)

(58) Field of Classification Search
CPC .......... B60B 19/04; A61G 5/06; A61G 5/061; B62B 5/026; B62B 9/02
See application file for complete search history.

(56) References Cited

U.S. PATENT DOCUMENTS 3,226,129 A * 12/1965 McKinley .............. A61G 5/065
152/5
4,154,315 A * 5/1979 Rasmussen ............ A61G 5/066
180/9.1
(Continued)

FOREIGN PATENT DOCUMENTS

DE          103 24 740       12/2004
DE     10 2011 052 615        2/2013
(Continued)

OTHER PUBLICATIONS

International Search Report dated May 29, 2019 issued in PCT International Patent Application No. PCT/IB2019/050619, 3 pp.

*Primary Examiner* — Jason R Bellinger
(74) *Attorney, Agent, or Firm* — NIXON & VANDERHYE P.C.

(57) ABSTRACT

A wheel includes a supporting frame, with a central portion having a center around which the wheel can turn, and a plurality of radial portions extending from the central portion angularly displaced with each other. A housing seat is delimited between two adjacent radial portions. A movable element is radially displaceable between a first working position located at a maximum distance with respect to the center, and a second working position located at a minimum distance with respect to the center of the central portion. The radial portions and the movable element have respective distal sections, with respect to the center, curved with a curvature radius corresponding to the curvature radius of the wheel and being flush with each other. A locking element is displaceable between one locking position, wherein it abuts on the movable element and prevents the radial displacement thereof, and one unlocking position, wherein it allows the radial displacement of the movable element toward the second working position. A returning element of the movable element between the supporting frame and the movable (Continued)

element is configured to bring the movable element back into the first working position. A band made of an elastically deformable material surrounds the distal sections of the plurality of radial portions and the movable element, at the circular perimeter of the wheel.

14 Claims, 5 Drawing Sheets

(51) Int. Cl.
*B60B 9/10* (2006.01)
*B62B 5/02* (2006.01)
*B62B 9/02* (2006.01)

(52) U.S. Cl.
CPC ............ *B62B 9/02* (2013.01); *B60B 2200/22* (2013.01); *B60B 2900/551* (2013.01); *B60B 2900/721* (2013.01); *B60Y 2200/48* (2013.01); *B60Y 2200/84* (2013.01)

(56) References Cited

U.S. PATENT DOCUMENTS

| | | | |
|---|---|---|---|
| 9,757,978 | B1 | 9/2017 | Emigh |
| 10,518,576 | B1 * | 12/2019 | Ebrahimi Afrouzi ........................ B60B 19/003 |
| 10,913,310 | B1 * | 2/2021 | Ebrahimi Afrouzi ... A47L 9/009 |
| 2006/0038360 | A1 | 2/2006 | Negishi |

FOREIGN PATENT DOCUMENTS

DE  10 2013 006 690   10/2014
EP      2 927 019     10/2015

\* cited by examiner

WHEEL WITH MOVABLE ELEMENTS

This application is the U.S. national phase of International Application No. PCT/IB2019/050619 filed Jan. 25, 2019 which designated the U.S. and claims priority to Italian Patent Application No. 102018000002050 filed Jan. 26, 2018, the entire contents of each of which are hereby incorporated by reference.

BACKGROUND

The present invention relates to a wheel and, more particularly, a wheel which can be mounted on a means of transport for one person, for example a wheelchair, or an object. The present invention also relates to a means of transport for one person or an object, which comprises such a wheel.

In the present invention reference will be explicitly made to a wheelchair, but the person skilled in the art will have no difficulty in understanding how the teachings of the present invention can be easily and directly applicable also to other means of transport for one person or object, such as for example a stretcher, a wheelchair, a stroller, a scooter having parallel wheels, a cart, a robot with two wheels, etc.

It is known that people with physical disabilities moving by a means of transport, for example, a wheelchair face a number of difficulties in their movement due to the presence of architectural barriers, which often prevent the reaching of a desired destination or make it extremely difficult.

The simple surmounting of an obstacle such as a side walk or some steps becomes very difficult not only to one person who guides his/her own wheelchair but also for who is accompanied, having the wheelchair to be dragged over the obstacle by a third party with the person on board.

In order to solve this drawback various types of means of transport have been proposed, for example powered wheelchairs (see for example the United States application US 2006/0038360 A1), equipped with tracklaying moving groups, which allow to overcome an obstacle such as a step or a side walk. However, those wheelchairs are quite bulky, expensive and complex to manufacture. Other solutions have been proposed in DE 10324740 A1 and EP 2927019 A1.

The need is therefore felt to propose a simpler and less expensive alternative solution, which allows reducing the difficulties in moving one person who is carried on a means of transport such as, for example, a wheelchair, or an object carried on a means of transport of a type mentioned above.

SUMMARY

The object of the present invention is therefore to allow to one means of transport, such as for example a wheelchair, to easily surmount an obstacle such as a side walk or one or more steps.

BRIEF DESCRIPTION OF THE DRAWINGS

The present invention will be now described, for illustrative but not limiting purposes, according to its preferred embodiments, with particular reference to the Figures of the accompanying drawings, wherein.

DETAILED DESCRIPTION

Figure 1:
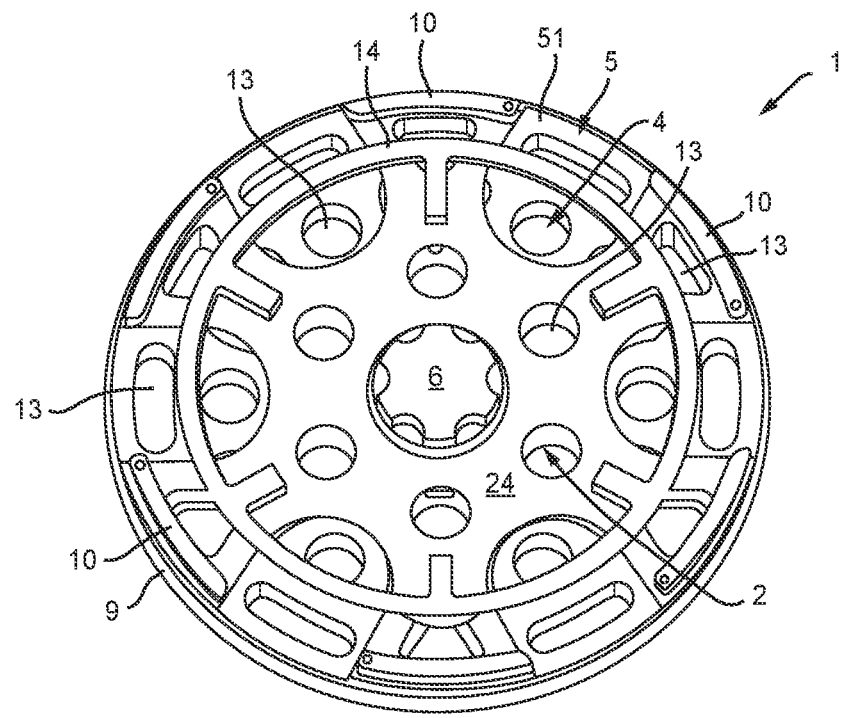
FIG. 1 shows a first face of a wheel according to the present invention.
Figure 1A:
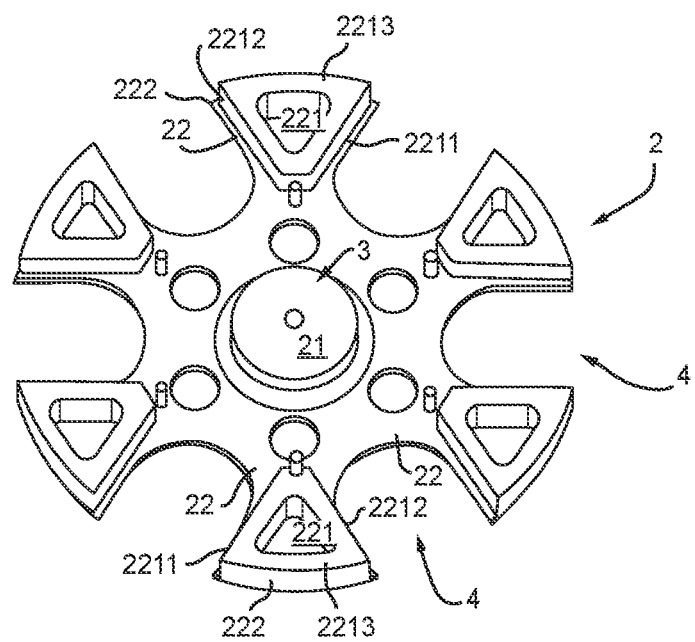
FIG. 1a shows a detail of the wheel of FIG. 1.

In the Figures the same reference numerals will be used for similar elements. In this regard, it is clarified that in order not to overburden the viewing of the Figures, some reference numbers for identical elements have been omitted.

Figure 2:
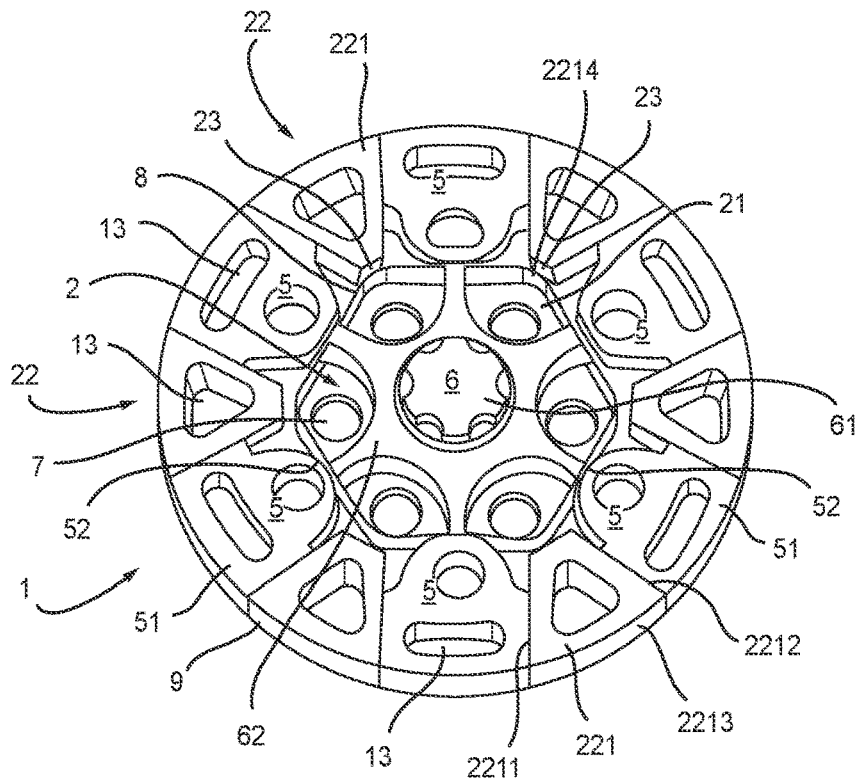
FIG. 2 is a representation of the face of the wheel of FIG. 1 with some parts removed so as to expose the internal configuration of the wheel, in a first working configuration.
Figure 3:
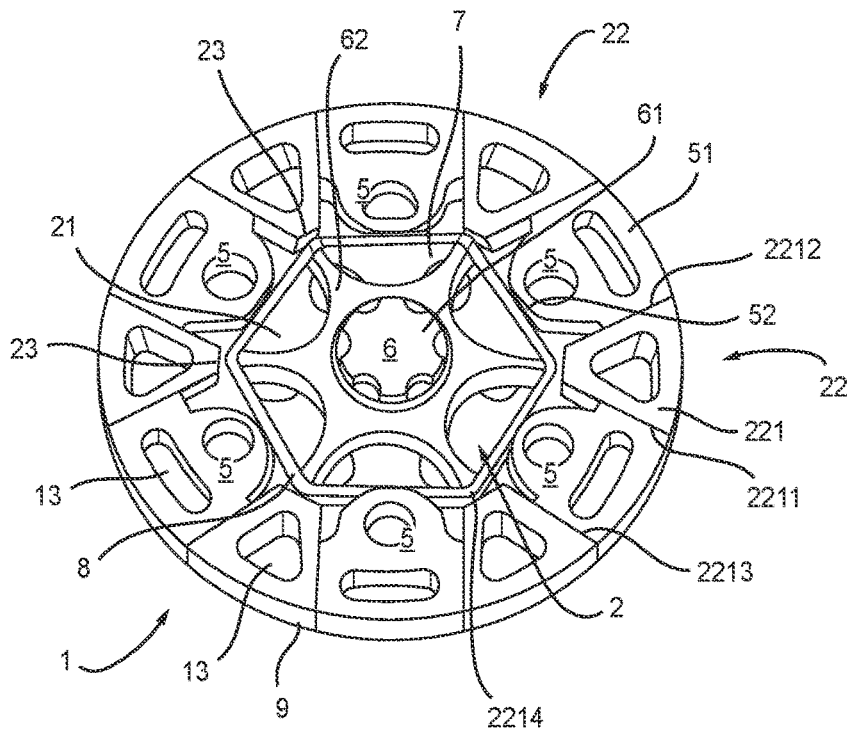
FIG. 3 illustrates the wheel of FIG. 1 with some parts removed so as to expose the internal configuration of the wheel, in a second working configuration.
Figure 4:
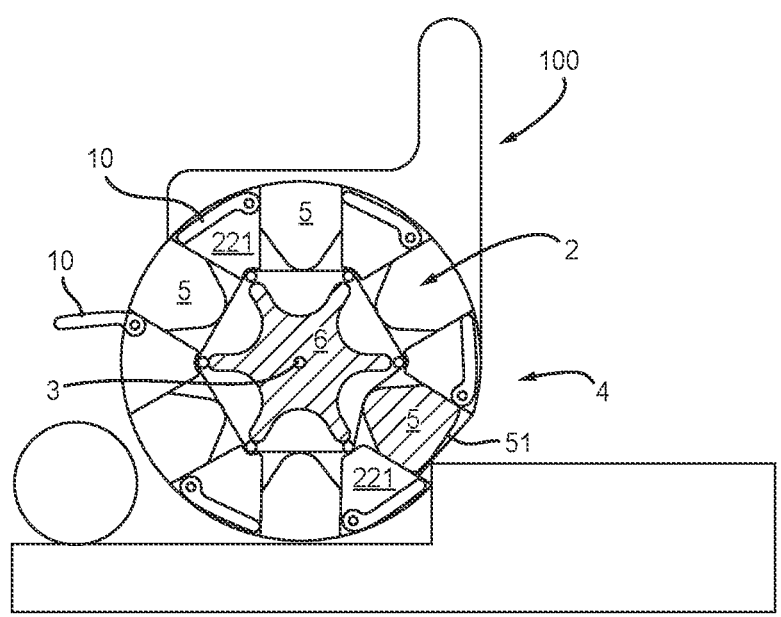
FIGS. 4 to 8 show the main steps of the movement of one means of transport provided with the wheels according to the present invention, during the surmounting of an obstacle, the wheel illustrated in those Figures being represented as in FIG. 3, to facilitate the understanding, although in practice the visible face of the wheel would be that of FIG. 1.
Figure 5:
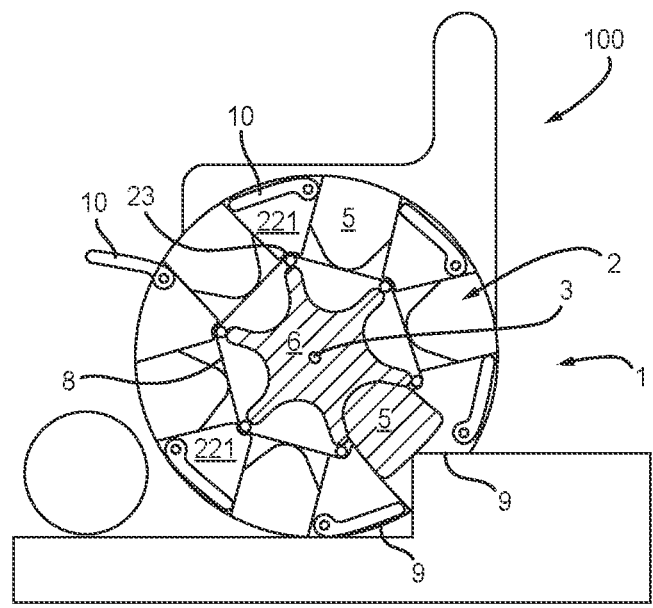
Figure 6:
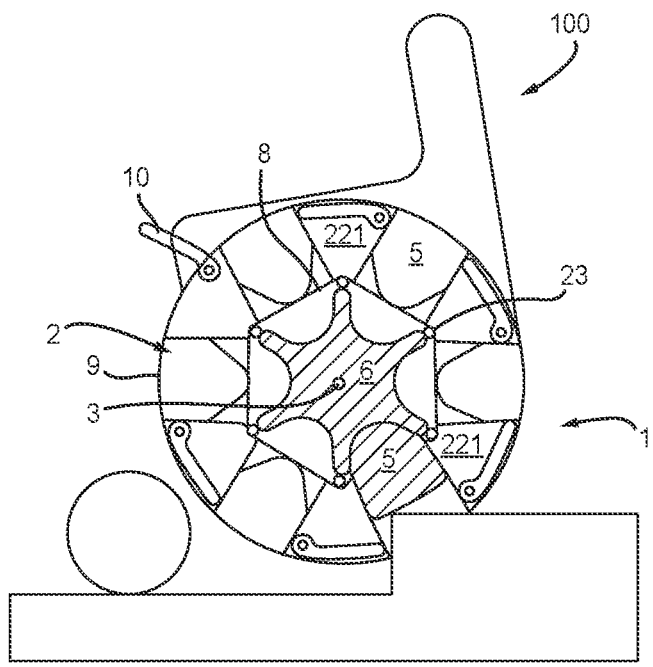
Figure 7:
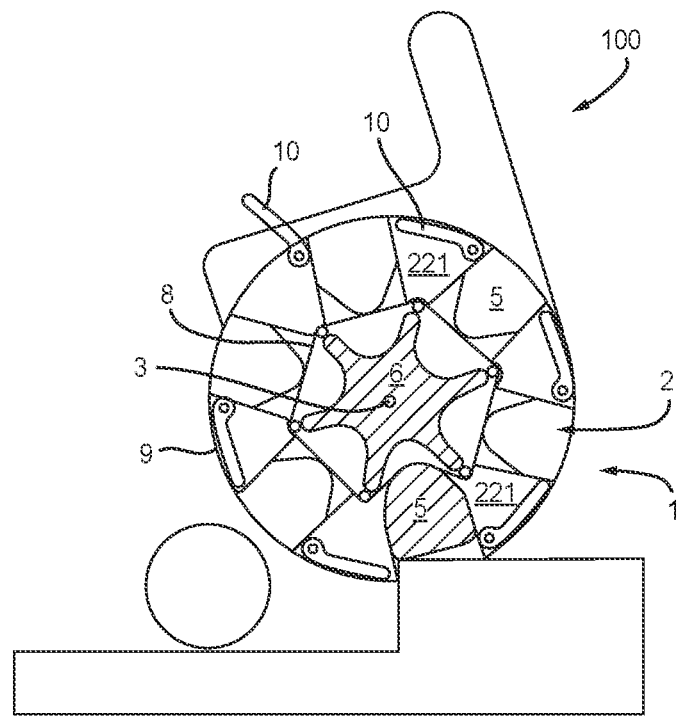
Figure 8:
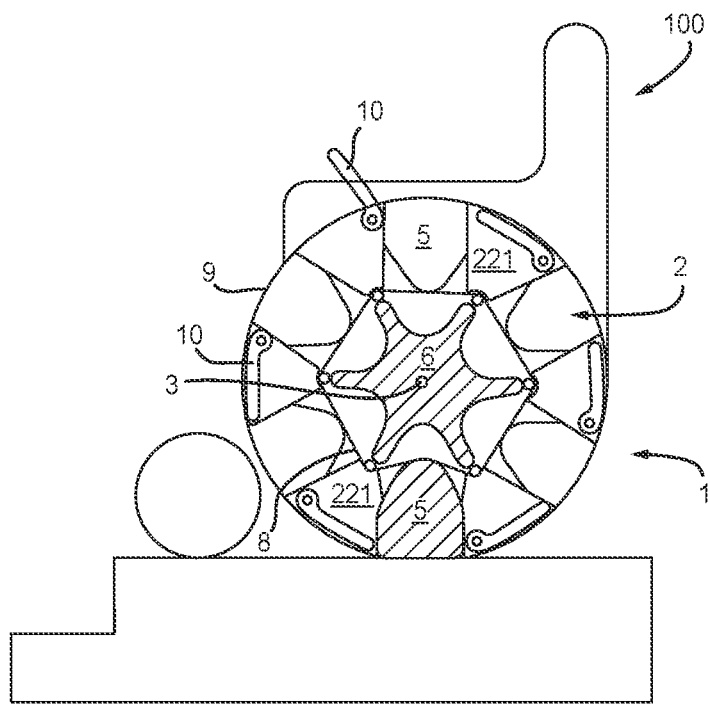

With particular reference to FIGS. 1 to 3, it will be noted that a wheel having a curvature radius, according to the present invention, is generally designated by the reference numeral 1 and comprises a supporting frame 2, e.g. made of metal or carbon or plastic fibres, including at least one central portion 21 having a center 3, at which the wheel can turn about it own axis of rotation, and a plurality of radial portions 22, extending from said central portion 21 angularly spaced with each other. Between two adjacent radial portions 22 a respective housing seat 4 is delimited (see in particular FIG. 1).

In this respect, advantageously, each one of the radial portions 22 comprises at least one section of greater thickness than the thickness of the central portion 21, provided by a respective strengthening and guide plate 221, optionally having a substantially triangular shape, wherein each side 2211 and 2212 of the strengthening and guide plate 221 helps delimit a respective housing 4.

Each strengthening and guide plate 221 further comprises at least one section 2213 distal with respect to the center 3 of the supporting frame 2, i.e. one section which is at a greater distance from the center 3 of the supporting frame 2. Said at least one distal section 2213 is curved and has a radius of curvature corresponding to the radius of curvature of the wheel 1 according to the present invention.

As will be noted in FIGS. 1 to 3, the supporting frame 2 has been represented as a set of separated parts, but the person skilled in the art will have no difficulty in understanding how it can also be advantageously made with a set of parts other than that described above or made in a single piece, provided that its overall configuration is as described above.

The wheel 1 according to the present invention comprises at least one movable element (or sector) 5, housed in a respective housing seat 4 and radially displaceable from and toward the center 3, between a first working position, wherein it is located at a maximum distance with respect to the center 3, and a second working position, wherein is located at a minimum distance with respect to the center 3 of said at least one central portion 21. In particular, the at least one movable element 5 of a preferred embodiment of the invention slides inside guiding grooves of the strengthening and guide plate 221, although other arrangements can be provided between the at least one element 5 and the radial adjacent portions 22.

For example, as shown in FIG. 1, the wheel 1 according to the present invention can comprise at least one panel 24, having configuration substantially corresponding to that of the supporting frame 2 and applicable thereto in such a way as to help delimit the housing seat 4, for each movable element 5, and respective guide grooves.

According to a particularly advantageous embodiment of the present invention shown in the Figures, the radial portions 22 are uniformly angularly spaced from one another and are at least three in number, optionally six. Accordingly, the movable elements 5 of the wheel 1 are at least in the number of three, optionally 6.

However, the present invention can comprise only one radial portion 22, delimiting a single housing seat 4 for one single movable element 5.

As it can be seen in the figures and in particular in FIG. 1, the radial portions 22 and the movable elements 5 have respective distal sections (222 and 51), with respect to the center 3 of the supporting frame 2, which are curved with a radius of curvature corresponding to the radius of curvature of the wheel. The distal sections 222 of the radial portions 22 and the distal sections 51 of the movable element 5 are flush with each other, when the plurality of movable elements 5 is located in the first working position, and therefore delimit a circular perimeter of the wheel 1.

The wheel 1 according to the present invention also comprises a locking element 6, optionally manually operable by means of an external knob provided for the purpose, which locking element is rotatably mounted on the supporting frame 2, at the center 3 about the axis of rotation of the wheel and angularly displaceable between a locking position, wherein it abuts on at least one movable element 5, preventing the radial displacement (see FIG. 2), and an unlocking position, wherein it allows the radial displacement of the movable element 5 toward the second working position (see FIG. 3).

Such a locking element 6 comprises a central portion 61 and a plurality of radial portions 62, extending from the central portion 61 angularly spaced from each other, at least one housing seat 7 of the locking element 6 being delimited between two adjacent radial portions 62. The number of radial portions 62 of the locking element 6 and the number of the housing seats 7 correspond to the number of movable elements 5 of the plurality of movable elements of the wheel 1.

In the case wherein the radial portions 22 of the supporting frame 2 are uniformly angularly spaced therebetween, the locking element 6 too comprises a plurality of radial portions 62 uniformly angularly spaced from one another in a corresponding manner.

As will be appreciated, each movable element 5 comprises at least one proximal section 52 with respect to the center 3 of the supporting frame 2, i.e. one section that is at a smaller distance from the center 3 of the supporting frame 2, and each housing seat 7, delimited by the locking element 6 is configured in a substantially complementary manner with respect to the proximal section 52 of a respective movable element 5.

Specifically, as shown in the Figures, each movable element 5 is configured substantially bell-shaped and each housing seat 7 of the locking element 6 has an inverted bell configuration, whereby the entire proximal section 52 of a respective movable element 5, which is in the second working position, substantially matches the respective housing seat 7, with interposition of at least one return element, as will be seen hereinafter.

The person skilled in the art will have no difficulty in understanding how other configurations of the proximal section 52 of each movable element 5 are possible, provided that they are complementary to the configuration of the respective housing seat 7 of the locking element 6, in such a way that the respective profiles match when the movable element 5 is located in the second working position, as described above.

The wheel 1 according to the present invention in fact also comprises one returning element 8 of the mobile elements 5, between the supporting frame 2 and the one or more movable elements 5, the returning element 8 being configured to attract each mobile element 5 in the first working position.

The returning element 8 comprises one band made of an elastically deformable material and the supporting frame 2 comprises a plurality of pins 23, wherein each pin 23 of the plurality of pins is fixed to the supporting frame 2 at a proximal section 2214, with respect to the center 3 of the supporting frame 2 of a respective strengthening and guide plate 221, the band 8 made of an elastically deformable material being inserted around the plurality of pins 23 whereby it is disposed orthogonally with respect to one radial moving direction of each movable element 5 of the wheel 1, when the movable element is in the first working position.

Other embodiments of the present invention can provide for elastic returning elements 8 directly connected to each movable element 5, such as springs, pistons and actuator elements, different from the returning element 8 of FIGS. 2 to 8 comprising one band of an elastically deformable material. The wheel 1 according to the present invention further comprises at least another band made of elastically deformable material 9, surrounding the distal sections 222, 2213 of the plurality of radial portions 22 and the distal sections 51 of the movable elements 5, at the periphery of the wheel 1. Such band 9 acts as the tyre to the wheel 1.

Advantageously, the wheel 1 according to the present invention further comprises one handle 10 (see in particular FIGS. 4 to 8) at each radial portion 22 of the supporting frame 2. The handle 10 is, in particular, pivotally mounted on a respective radial portion 22, optionally at the panel 24 described above, and is also movable between one rest position, wherein it remains within the overall dimensions of the radial portion 22, and one use position wherein it extends substantially radially with respect to the supporting frame 2, whereby it can be gripped by one person.

Optionally, the wheel 1 according to the present invention also comprises an additional returning element, not shown in the figures, for each handle, configured to recall a respective handle 10 in the rest position, when it is not in use. Such an additional returning element can comprise one spring loading element, fixed on one side to the handle 10 and on the other side to the distal section 222 of a respective radial portion 22. Clearly, the person skilled in the art will have no difficulty in understanding that other additional returning elements can be provided, performing the same function as the one described above.

Optionally, the wheel 1 according to the present invention, also includes one mechanism of selective control of the rotation of the wheel itself, not shown in the figures, configured to selectively lock the rotation of the wheel in one predetermined direction. Such a mechanism of selective control of the rotation of the wheel can comprise, for example, a toothed wheel attached to the central portion 21 of the supporting frame 2, at the center 3, in alignment with the axis of rotation of the wheel 1 and at least one ratchet configured to engage the teeth of the toothed wheel, which ratchet allows, depending on its position, the rotation of the wheel only in one predetermined direction.

As can be seen from the Figures, in the supporting frame 2 and the plurality of movable elements 5 through lightening openings 13 can be provided, which contribute to reduce the weight of the wheel 1.

The wheel 1 according to the present invention can also comprise a circular handle 14, fixed to the supporting frame 2, optionally also to the panel 24 as described above, in alignment with an axis passing through the center 3 of the wheel, which can be used for the manual movement of the wheel itself.

The wheel 1 as described above can be advantageously mounted on one means of transport of one person, for example a wheelchair 100, in replacement of each rear wheel of the wheelchair, i.e. those in correspondence of the seat of the wheelchair, which can be moved manually by one person sitting on a wheelchair.

In fact, it can be used according to two configurations for use. In one first configuration, the locking element 6 is in the locking position and abuts on the plurality of movable elements 5 preventing their radial displacement. In this configuration, the wheel 1 of the present invention is, in operation, wholly similar to a traditional wheel, whereby it can be moved to travel routes with no level discontinuity (such as steps), in the usual manner, for example by handling and rotating the band 9 which acts as a tyre, or the circular handle 14, or the handles 10, in a forward direction to go forward and in a rearward direction to go backwards.

In the second configuration of use, the locking element 6 is in the unlocking position and therefore it allows the radial displacement of the movable elements 5 of the wheel (FIGS. 4 to 8). This configuration is particularly advantageous for the surmounting of obstacles such as a side walk or a step.

As can be seen in the sequence of FIGS. 4 to 8, to surmount an obstacle such as a side walk or step, one person on a wheelchair 100 (or anyone else for him/her) must place the wheelchair 100 with the rear wheels against the side walk, in particular with one distal section 51 of a movable element 5 close to the obstacle, optionally with a central portion of the distal section 51 of a movable element 5 close to the obstacle.

Right after or just before (FIG. 4), the person on the wheelchair 100 (or anyone else for him/her) can bring the locking element 6 in the unlocking position, for example by causing it to rotate through a certain number of degrees (which depends on the configuration of the supporting frame 2 of the wheel 3, in the example shown the rotation is ±15°), so that the movable elements 5 are free to move radially between the first and second working position.

The person (or anyone else for him/her) at this point must make the wheels rotate backwards, so as to have the wheelchair 100 moving backwards on the obstacle. If a person manoeuvres autonomously the wheelchair 100, in order to have the wheelchair 100 move backwards on the obstacle, alternatively to grip the handle 14 or directly the wheel 1, he/she can grip one handle 10.

In any case, due to the effect of the displacement of the wheel 1 toward the obstacle, the movable element 5 moves toward the second working position, and thus it allows the wheel 1 to "engage" the obstacle. Not only that, it is clear that such a displacement helps in fact to reduce the resisting torque, opposing the backward movement of the wheelchair 100, since the arm of the resisting torque is less than the radius of the wheel, when the locking element 6 is in the locking position.

Not only that, if the person on the wheelchair 100 grips the handle 10 and, therefore, actually extends the application arm of the force applied by him/her with his/her arms, the torque achievable with the arms, for the backward displacement of the same, also increases.

Such a difference between the torque applied for the displacement by the person on a wheelchair 100, and the resisting torque (both whether or not the handle 10 is used) is always advantageous for the person on the wheelchair 100 who, with only the force of his/her arms, is able to easily drag the wheelchair 100 beyond the obstacle.

Optionally, during surmounting of the obstacle the mechanism of selective control of the rotation of the wheel can be activated, so that the wheel does not rotate forward during the surmounting of the obstacle. With the forward rotation blocked, the wheel could be rotated backwards by subsequent rotation movements, which may be more convenient for one person who is not able to apply one force for a prolonged period of time, necessary to the completion of the entire surmounting obstacle manoeuvre.

The inventor has carried out analytical calculations on a prototype of a means of transport such as that shown in FIGS. 4 to 8 provided with wheels according to the invention shown in FIGS. 1 to 3, by estimating the dynamic and constraining forces. These calculations allowed to verify that, by applying one force F, for each arm, equal to approximately 20-25 kg, it is possible to easily lift a person of 80-100 kg weight.

Once the obstacle has been surmounted, the movable element 5 of the wheel 1 that was moved radially in order to allow the wheel to engage the obstacle, returns in the first working position because of the returning element 8 and the locking element 6 can therefore be rotated in the locked position.

It will be appreciated that with such a configuration of the wheel 1, a wheelchair 100 can also be easily transported on one escalator without danger, provided that the wheels have dimensions such as to allow engaging the steps of the escalator.

The wheel 1 described above is of great help not only to one person moving autonomously on the wheelchair 100, but also for those who must carry one person on a wheelchair 100. The displacement of the movable elements 5 always reduces the resisting torque opposing to the movement, so that who pulls the wheelchair 100 to make it go backwards on an obstacle, in fact can exert one force less than that required for one traditional wheelchair, under the same conditions. In addition one wheelchair 100 moved as above does not make annoying bounces, normally made by traditional wheelchairs, during the surmounting of an obstacle.

In view of the above, it clearly appears that the wheel and the wheelchair according to the present invention offers numerous advantages and reach the objects in the preamble.

In fact, the wheel 1 and the wheelchair 100 described above considerably facilitate the surmounting of an obstacle, such as a side walk, one or more steps, while remaining little bulky, simple in their construction and therefore easy to implement.

In the foregoing the preferred embodiments were described and some modifications of the present invention have been suggested, but it should be understood that those skilled in the art can make modifications and changes without departing from the relative scope of protection, as defined by the appended claims.

The invention claimed is:

1. A wheel having a curvature radius, comprising:
   a supporting frame, including a central portion having a center around which said wheel can turn, and at least one plurality of radial portions, extending from said central portion angularly displaced with each other, at least one housing seat being delimited between two adjacent radial portions;

at least one movable element, housed in a respective housing seat and radially displaceable between a first working position, wherein the at least one movable element is located at a maximum distance with respect to said center, and a second working position, wherein the at least one movable element is located at a minimum distance with respect to said center of said central portion, said at least one plurality of radial portions and said at least one movable element having respective distal sections, with respect to said center, curved with a curvature radius corresponding to the curvature radius of said wheel and being flush with each other, when said at least one movable element is located in said first working position, thereby delimiting a circular perimeter of said wheel;

a locking element for said at least one movable element, displaceable between one locking position, wherein the locking element abuts on said at least one movable element and prevents the radial displacement thereof, and one unlocking position, wherein the locking element allows the radial displacement of said at least one movable element toward said second working position;

a returning element of said at least one movable element, comprised between said supporting frame and said at least one movable element, said returning element being configured to bring said at least one movable element back into said first working position; and a band made of an elastically deformable material, surrounding said distal sections of said at least one plurality of radial portions and said at least one movable element, at said circular perimeter of said wheel.

2. The wheel according to claim 1, wherein said at least one plurality of radial portions comprises at least three radial portions uniformly angularly displaced with each other, and said at least one movable element comprises at least three movable elements.

3. The wheel according to claim 1, wherein said radial portions of said at least one plurality of radial portions, each comprise a strengthening and guiding plate, wherein sides of said strengthening and guiding plate delimit the housing seat for a respective movable element.

4. The wheel according to claim 3, wherein each strengthening and guide plate comprises a curved distal section, showing a curvature radius corresponding to the curvature radius of said wheel.

5. The wheel according to claim 1, wherein said locking element is rotatably mounted on said supporting frame, at said center, and is angularly displaceable, and comprises a central portion having a center and at least one plurality of radial portions, extending from said central portion angularly displaced with each other, at least one housing seat of said locking element being delimited between two adjacent radial portions of said at least one plurality of radial portions, the number of radial portions of said at least one plurality of radial portions and the number of said housing seats corresponding to the number of movable elements of said wheel.

6. The wheel according to claim 5, wherein each movable element comprises a proximal section with respect to said center, and wherein each housing seat of said locking element is configured in a substantially complementary manner to that of the proximal section of a respective movable element.

7. The wheel according to claim 5, wherein each movable element is substantially bell-shaped, and wherein each housing seat of said locking element has a substantially inverted bell-shaped configuration, so that the proximal section of a respective movable element, in said second working configuration, substantially fits with said housing seat.

8. The wheel according to claim 1, wherein said returning element comprises a band made of an elastically deformable material and said supporting frame comprises a plurality of pins, each pin of said plurality of pins being fixed to said supporting frame at a proximal section, with respect to said center, of a respective strengthening and guide plate, said band being slipped around said plurality of pins so that said band is arranged orthogonally with respect to one radial displacement direction of each movable element, when said movable element is located in the said first working position.

9. The wheel according to claim 1, wherein said returning element is directly connected to said at least one movable element.

10. The wheel according to claim 1, comprising at least one handle at each radial portion of said supporting frame, said handle being pivotally mounted on a respective radial portion and movable between one rest position, wherein the at least one handle is within the radial dimensions of said radial portion and one working position, wherein the at least one handle extends substantially radially with respect to said supporting frame, whereby the at least one handle is holdable by a person.

11. The wheel according to claim 1, wherein lightening through openings are obtained in said supporting frame and in said at least one plurality of movable elements.

12. The wheel according to claim 1, comprising a circular handle, fixed to said supporting frame, for the manual movement of said wheel.

13. A transport means comprising at least two wheels, wherein each wheel has a curvature radius, and comprises:

a supporting frame, including a central portion having a center around which said wheel can turn, and at least one plurality of radial portions, extending from said central portion angularly displaced with each other, at least one housing seat being delimited between two adjacent radial portions;

at least one movable element, housed in a respective housing seat and radially displaceable between a first working position, wherein the at least one movable element is located at a maximum distance with respect to said center, and a second working position, wherein the at least one movable element is located at a minimum distance with respect to said center of said central portion, said at least one plurality of radial portions and said at least one movable element having respective distal sections, with respect to said center, curved with a curvature radius corresponding to the curvature radius of said wheel and being flush with each other, when said at least one movable element is located in said first working position, thereby delimiting a circular perimeter of said wheel;

a locking element for said at least one movable element, displaceable between one locking position, wherein the locking element abuts on said at least one movable element and prevents the radial displacement thereof, and one unlocking position, wherein the locking element allows the radial displacement of said at least one movable element toward said second working position;

a returning element of said at least one movable element, disposed between said supporting frame and said at least one movable element, said returning element being configured to bring said at least one movable element back into said first working position; and a band made of an elastically deformable material, surrounding said distal sections of said at least one plurality of radial portions and said at least one movable element, at said circular perimeter of said wheel;

wherein said transport means is one of: a wheelchair, a stretcher, a baby carriage, a stroller, a parallel wheeled scooter, a cart, and a robot having two wheels.

14. The wheel according to claim 3, wherein said strengthening and guiding plate is substantially triangularly configured.

* * * * *